United States Patent [19]

Reen

[11] 4,115,158

[45] Sep. 19, 1978

[54] PROCESS FOR PRODUCING SOFT MAGNETIC MATERIAL

[75] Inventor: Orville W. Reen, New Kensington, Pa.

[73] Assignee: Allegheny Ludlum Industries, Inc., Pittsburgh, Pa.

[21] Appl. No.: 839,086

[22] Filed: Oct. 3, 1977

[51] Int. Cl.² ........................ C04B 35/00; H01F 1/04; H01F 1/14

[52] U.S. Cl. .................................. 148/31.55; 75/200; 75/211; 75/246; 148/105; 428/928

[58] Field of Search ......................... 75/246, 211, 200; 148/105, 31.55; 428/928

[56] References Cited

U.S. PATENT DOCUMENTS

| | | | |
|---|---|---|---|
| 4,030,913 | 6/1977 | Wegener | 75/0.5 BA |
| 4,047,983 | 9/1977 | Falkowski | 148/105 |

*Primary Examiner*—Brooks H. Hunt

*Attorney, Agent, or Firm*—Vincent G. Gioia; Robert F. Dropkin

[57] ABSTRACT

A process for producing a phosphorus-bearing soft magnetic material. The process includes the steps of blending iron powder and ferro-phosphorus powder into a mixture containing from 0.4 to 1.25% phosphorus; pressing said blended mixture into a compact; and sintering said compact in a non-oxidizing atmosphere. The iron and ferro-phosphorus powder respectively have no more than 0.02 and 0.2% calcium. The ferro-phosphorus powder has from 12 to 30% phosphorus.

5 Claims, No Drawings

PROCESS FOR PRODUCING SOFT MAGNETIC MATERIAL

The present invention relates to a process for producing a soft magnetic material.

United States Pat. application Ser. No. 571,169, filed Apr. 24, 1975, now U.S. Pat. No. 4,047,983 discloses a powder metallurgical process for producing phosphorus-bearing soft magnetic materials. Described therein is a process for producing soft magnetic material characterized by a magnetizing force to reach 10 kilogauss of no more than 2.0 oersteds, and a coercive force from 10 kilogauss of no more than 0.9 oersteds. Through the present invention, there is now provided a significant advance over the teachings of Ser. No. 571,169. In accordance with the present invention, soft magnetic materials are produced from ferro-phosphorus powder having a low calcium content. Calcium has been found to have a deleterious effect upon the magnetic properties of phosphorus-bearing soft magnetic materials.

Other references describing phosphorus-bearing soft magnetic materials, and processing therefore, are: "Effect Of Phosphorus Additions Upon The Magnetic Properties Of Parts From Iron Powder, I. Investigation In A Constant Field", by O. A. Panasyuk and I. D. Radomysel'skii, translated from Poroshkovaya Metallurgiya, No. 3(123), pages 23–26, March 1973; "Effect of Phosphorus Additions Upon The Magnetic Properties Of Parts From Iron Powder, II. Investigation In Alternating Fields", by O. A. Panasyuk and I. D. Radomysel'skii, translated from Poroshkovaya Metallurgiya, No. 4(124), pages 29–32, April 1973; "Effect of Processing Factors On The Shrinkage And Magnetic Properties Of Parts Produced From Iron-Phosphorus Powder", by A. G. Bol'shechenko, O. A. Panasyuk, A. B. Mirzoyan, L. A. Zhukovskaya and E. Ya Popichenko, translated from Poroshkovaya Metallurgiya, No. 12(120) pages 42–45, December 1972; "Iron Powder Makes Tough Magnetic P/M Parts", Precision Metal, July 1976, page 30; U.S. Pat. No. 3,836,355, issued Sept. 17, 1974; and "Production of Soft Magnetic Materials From Iron-Phosphorus Powders by Dynamic Hot Pressing", Chemical Abstracts, 1977, Volume 86, page 182, No. 192967r. As with Ser. No. 571,169, none of these references disclose the use of low calcium ferro-phosphorus powder. None of them show an awareness as to the benefits attributable to its use. In another reference, "Phosphorus As An Alloying Element In Ferrous P/M", by P. Lindskog, J. Tengzelius and S. A. Kvist, Modern Developments In Powder Metallurgy, Volume 10, Ferrous and Non-Ferrous P/M Materials, pages 97–128, copyright 1977, from the Proceedings of the 1976 International Powder Metallurgy Conference; reference is made to the problem of certain impurities on the mechanical properties of sintered iron-phosphorus alloys. No specific reference to calcium is, however, found therein. Moreover, said reference makes no connection between magnetics and ferro-phosphorus impurities in general, no less calcium. Perhaps, a study as to the effect of ferro-phosphorus impurities on magnetics has been overlooked as only a small amount of ferro-phosphorus is used in the manufacture of phosphorus-bearing soft magnetic materials. In still another reference, Belgian Pat. No. 847,545, published Feb. 14, 1977; the effect of impurities in ferro-phosphorus is discussed. Pat. No. 847,545 does not, however, deal with ferro-phosphorus having a specific low calcium content. Moreover, no reference to magnetic properties is found therein. It and the other references discussed hereinabove do not disclose a process for producing a soft magnetic material from low calcium ferro-phosphorus powder.

It is accordingly an object of the present invention to provide a process for producing a soft magnetic material from low calcium ferro-phosphorus powder.

The present invention provides a process for producing a phosphorus-bearing soft magnetic material. In accordance therewith, a blend of iron powder and ferro-phosphorus powder, having between 0.4 and 1.25% phosphorus, and preferably between 0.5 and 0.9% phosphorus, is pressed into a compact and sintered in a non-oxidizing atmosphere. As calcium has been found to have a deleterious effect upon magnetic properties, the calcium content of the ferro-phosphorus is limited to a maximum of 0.2%, and preferably, to a maximum of 0.15%. For similar reasons, the calcium content of the iron powder is limited to a maximum of 0.02%, and preferably, to a maximum of 0.015%. The maximum calcium allowable in the iron powder is less than in the ferro-phosphorus powder, as considerably more iron powder is used in making the blend. The ferro-phosphorus powder has a phosphorus content of from 12 to 30%. In most instances, the phosphorus content is in excess of 18%. With higher phosphorus contents, less ferro-phosphorus is required; and insofar as commercial ferro-phosphorus is high in calcium, this could mean less refining. Refining could involve any of the procedures known to those skilled in the art. As for pressing and sintering, they should be respectively carried out at a minimum pressure of 20 tons per square inch and a minimum temperature of 12150° F. A preferred sintering temperature is from 2225° to 2275° F. As noted hereinabove, sintering is carried out in a non-oxidizing atmosphere. Typical atmospheres are hydrogen, vacuum and dissociated ammonia. Sintering times are generally at least 10 minutes, and preferably at least 20 minutes, at temperature. They cannot be precisely set forth as they are dependent upon various factors such as sintering temperature and the size of the compact.

Other Group IIA metals, such as magnesium, could be expected to be detrimental to magnetic properties, as is calcium. These metals are, however, practically non-existent in ferro-phosphorus and high purity iron powder; and as a result thereof, are not discussed in greater detail. For purposes of completeness, the subject invention can call for iron and ferro-phosphorus powder respectively having no more than 0.03 and 0.3% of metal from Group IIA of the Periodic Table.

As for the soft magnetic material, it has no more than 0.04% calcium, and preferably no more than 0.03% calcium. Similarly, it has no more than 0.06%, and preferably no more than 0.045%, of metal from Group IIA of the Periodic Table. Said material consists essentially of from 0.4% to 1.25% phosphorus, up to 0.06% of metal from Group IIA of the Periodic Table, up to 0.05% carbon, up to 1.0% manganese, up to 0.05% sulfur, up to 1.0% silicon, balance iron.

The following examples are illustrative of several embodiments of the invention.

Iron powder was blended with six different ferro-phosphorus powders (Powders A through F). The chemistry of the iron powder is set forth herinbelow in Table I. That for the ferro-phosphorus powders is set forth in Table II.

TABLE I.

| | Composition of Fe Powder (wt. percent) | | | | | | | | | | | | | |
|---|---|---|---|---|---|---|---|---|---|---|---|---|---|---|
| C | Mn | P | S | Si | Cr | Ni | Al | Mo | Cu | Ti | Sn | Ca | Mg | Fe |
| 0.0024 | 0.070 | 0.007 | 0.0073 | 0.019 | 0.12 | 0.062 | 0.008 | 0.005 | 0.034 | 0.003 | 0.030 | 0.007 | 0.002 | BAL. |

TABLE II.

| | Composition of Ferro-Phosphorus Powders (wt. percent) | | | | | | | | | | | | | | |
|---|---|---|---|---|---|---|---|---|---|---|---|---|---|---|---|
| POWDER | C | Mn | P | S | Si | Cr | Ni | Cu | V | Ti | Pb | Sn | Ca | Al | Fe |
| A. | 0.08 | 0.16 | 17.59 | 0.002 | <0.01 | 0.05 | 0.07 | 0.091 | 0.055 | 0.021 | <0.005 | 0.01 | 0.04 | 0.009 | BAL. |
| B. | 0.06 | 0.07 | 20.09 | 0.001 | <0.01 | 0.19 | 0.02 | 0.06 | 0.005 | 0.23 | <0.002 | 0.011 | 0.13 | 0.008 | BAL. |
| C. | 0.09 | 1.97 | 19.54 | — | 2.91 | — | — | — | 0.051 | 0.43 | — | — | 0.15 | 0.011 | BAL. |
| D. | 0.09 | 1.41 | 26.11 | 0.003 | 0.6 | 0.16 | 0.04 | 0.04 | 0.007 | 0.19 | <0.002 | 0.024 | 0.26 | 0.011 | BAL. |
| E. | 0.32 | 4.91 | 23.53 | 0.010 | 2.92 | 0.13 | 0.07 | 0.051 | 0.11 | 0.23 | <0.005 | 0.01 | 2.20 | 0.12 | BAL. |
| F. | 0.18 | 1.66 | 25.69 | 0.011 | 1.34 | 0.20 | 0.02 | 0.03 | 0.006 | 0.15 | <0.002 | 0.022 | 4.47 | 0.057 | BAL. |

The proportions of iron powder and ferro-phosphorus powders were controlled so as to produce six blends (Blends A through F), having 0.75% phosphorus. Blends A through F respectively correspond to Powders A through F.

The blended powders were pressed into magnetic test rings at pressures up to 45 tons per square inch, and subsequently sintered in vacuum for 60 minutes at 2250° F. The density of the rings appears hereinbelow in Table III, along with their magnetic test results. The magnetic test results specify the maximum magnetizing force to reach an induction of 10 kilogauss and the coercive force (the force required to bring the residual induction down to zero) from said induction.

TABLE III.

| Test Ring From Blend | Density (g/cu. cm.) | Maximum Magnetizing Force For 10 KB Induction (oersteds) | Coercive Force From An Induction of 10 KB (oersteds) |
|---|---|---|---|
| A. | 7.08 | 1.90 | 0.852 |
| B. | 7.04 | 1.83 | 0.811 |
| C. | 7.08 | 1.81 | 0.796 |
| D. | 7.04 | 2.04 | 0.837 |
| E. | 7.00 | 3.02 | 0.940 |
| F. | 7.05 | 2.23 | 0.870 |

From Table III it is noted that the test rings prepared from Blends A, B and C had a lower magnetizing force and, in all but one instance, a lower coercive force than did the test rings prepared from Blends D, E and F. Significantly, Blends A, B and C were prepared from ferro-phosphorus powder within the subject invention, whereas Blends D, E and F were not. Blends A, B and C were prepared from ferro-phosphorus powder having less than 0.2% calcium. On the other hand, the ferro-phosphorus used to prepare Blends D, E and F had at least 0.26% calcium. Note that the test rings prepared from Blends A, B and C were characterized by a magnetizing force to reach 10 kilogauss of less than 2.0 oersteds, and a coercive force from 10 kilogauss of less than 0.9 oersted. Such properties are characteristic of material produced in accordance with the subject invention.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

I claim:

1. In a process for producing a phosphorus-bearing soft magnetic material, which process includes the step of: blending iron powder and ferro-phosphorus powder into a mixture containing from 0.4 to 1.25% phosphorus; pressing said blended mixture into a compact; and sintering said compact in a non-oxidizing atmosphere; the improvement comprising the step of blending ferro-phosphorus powder having no more than 0.2% calcium with iron powder having no more than 0.02% calcium, said ferro-phosphorus powder having from 12 to 30% phosphorus.

2. The improvement according to claim 1, wherein said ferro-phosphorus has no more than 0.15% calcium.

3. The improvement according to claim 1, wherein said iron powder has no more than 0.015% calcium.

4. The improvement according to claim 1, wherein said ferro-phosphorus has at least 18% phosphorus.

5. A phosphorus-bearing soft magnetic material characterized by a magnetizing force to reach 10 kilogauss of no more than 2.0 oersteds, and a coercive force from 10 kilogauss of no more than 0.9 oersted, and made in accordance with the process of claim 1.

* * * * *